(12) United States Patent
Debroy et al.

(10) Patent No.: US 7,977,425 B2
(45) Date of Patent: Jul. 12, 2011

(54) CO-MILLING ORGANIC PIGMENTS WITH FUMED SILICA

(75) Inventors: Tapan K. Debroy, Avondale, PA (US); James Will, Bear, DE (US)

(73) Assignee: Ciba Corporation, Tarrytown, NY (US)

( * ) Notice: Subject to any disclaimer, the term of this patent is extended or adjusted under 35 U.S.C. 154(b) by 500 days.

(21) Appl. No.: 12/004,306

(22) Filed: Dec. 20, 2007

(65) Prior Publication Data

US 2008/0167416 A1    Jul. 10, 2008

Related U.S. Application Data

(60) Provisional application No. 60/878,804, filed on Jan. 5, 2007.

(51) Int. Cl.
*C08G 18/63* (2006.01)
*B32B 9/04* (2006.01)

(52) U.S. Cl. .................... 524/700; 428/411.1

(58) Field of Classification Search .......... 524/700; 428/411.1; 106/308
See application file for complete search history.

(56) References Cited

U.S. PATENT DOCUMENTS

| 3,663,285 A * | 5/1972 | Graf et al. ............... 106/491 |
| 4,405,729 A | 9/1983 | Schweitzer ............... 523/466 |
| 4,704,295 A | 11/1987 | Porter et al. ............... 427/3 |
| 5,618,343 A | 4/1997 | Hendi et al. ............... 106/498 |
| 5,633,108 A | 5/1997 | Christy et al. ............... 430/110 |
| 5,667,580 A | 9/1997 | Bäbler ............... 106/499 |
| 5,997,627 A * | 12/1999 | Babler ............... 106/493 |
| 6,613,832 B2 * | 9/2003 | Friel et al. ............... 524/515 |
| 7,122,081 B2 | 10/2006 | He et al. ............... 523/160 |
| 2004/0194666 A1 | 10/2004 | Hendi ............... 106/499 |

FOREIGN PATENT DOCUMENTS

| GB | 2027341 | 2/1980 |
| WO | 93/24565 | 12/1993 |

OTHER PUBLICATIONS

Anonymous: "Composition and process for forming visual images" (T. A. Jadwin, J. W. Consaul, C. E. Cowan); Research Disclosure, Mason Publications, Hampshire, GB (1977).

* cited by examiner

*Primary Examiner* — William K Cheung
(74) *Attorney, Agent, or Firm* — Joseph Suhadolnik; Qi Zhuo

(57) ABSTRACT

A pigment composition comprising an intimate mixture of an organic pigment and fumed silica is prepared which exhibit improved coloristic characteristics including excellent chroma, color strength and enhanced color flop when incorporated into in polymeric systems, such as plastics or surface coatings, for example inks and paints. Also provided are coating compositions and plastic articles that are pigmented with a tinctorially effective amount of the inventive pigment composition. A particular embodiment of the invention relates to pigments useful in automotive coatings.

10 Claims, No Drawings

CO-MILLING ORGANIC PIGMENTS WITH FUMED SILICA

This application claims benefit under 35 USC 119(e) of U.S. provisional application No. 60/878,804, filed Jan. 5, 2007

A pigment composition comprising an intimate mixture of an organic pigment and fumed silica and methods of preparing the pigment compositions are disclosed. The pigment compositions exhibit improved coloristic characteristics including excellent chroma, color strength and enhanced color flop when incorporated into in polymeric systems, such as plastics or surface coatings, for example inks and paints. The present invention also provides coating compositions and plastic articles that are pigmented with a tinctorially effective amount of a pigment composition which comprises an intimate mixture of an organic pigment and fumed silica. A particular embodiment of the invention relates to pigments useful in automotive coatings.

BACKGROUND

Organic pigments, as opposed to dyes, are insoluble in the substrate into which they are incorporated. As a result, the coloristic properties of pigments depend on more that just the chemical formula of the pigment. Other features, such as the crystal form and the size and shape of the pigment particle also impact coloristic properties. Therefore, preparing a pigment involves more than just chemical synthesis; the treatment of the pigment after isolation from the reaction mixture can have a profound impact on how the pigment colors a substrate.

It is well known in the art that organic pigments, such as quinacridones, DPPs, perylenes etc, must be further processed after synthesis to develop the requisite pigmentary properties such as particle size, particle shape, polymorphic phase, tinctorial strength etc. Consequently, crude organic pigments undergo one or more finishing or conditioning steps that typically involve particle size reduction such as wet or dry milling, also referred to as grinding. See, for example R. B. McKay, "Control of the Application Performance of Classical Organic Pigments" in JOCCA, 89 93.

Many variations of milling a pigment including wet milling, dry milling, high speed milling etc, are well known. The procedure is typically carried out in the presence of auxiliaries, such as salts or metal oxides, fillers, rheology control agents and other adjuvants.

U.S. Pat. No. 5,667,580, incorporated herein in its entirety by reference, discloses the preparation of organic pigments with small particle size by milling, blending or pulverizing larger particle size pigments in the presence of fillers including alumina and silica fillers.

U.S. Pat. No. 7,122,081, incorporated herein in its entirety by reference, discloses a process for reducing particle size of organic pigments by milling the crude pigment in the presence of a water soluble styrene copolymer dispersant, optionally a defoamer and/or additive in water.

Optical properties beyond hue and color strength are also important in pigmented plastics and coatings. Effect pigments, also known as gloss or lustrous pigments, are well known as pigments which produce unique coloristic effects. For example, goniochromatic luster pigments exhibit an angle-dependent color change. That is, these pigments produce a "flop effect" whereby the coloristic characteristics change depending on the viewing angle. In general, when a change in viewing angle results in a change in lightness, the effect is referred to as "lightness flop", and when the change is in hue, the effect is referred to as "color flop".

Due to their unique color characteristics, the market for effect pigments is growing in such uses as cosmetics, inks, for example security printing inks, plastics and paints, for example, automotive coatings.

Effect pigments are predominately mica pigments, optically variable interference pigments or metallic pigments whose optical effect is based on the directed reflection of light at predominantly sheetlike, mutually parallel-oriented, metallic or strongly refractive pigment particles. These pigments typically have a light-reflecting platelet-shaped core which is coated with alternating low and high refractive layers.

Organic pigments are often used in combination with non-organic effect pigments to obtain a particular color and optical effect. It is known that organic pigments can be prepared which exhibit substantially greater color flop when used in polymer systems.

U.S. Pat. No. 5,618,343, incorporated herein in its entirety by reference, discloses pigment compositions with an unusual flop-effect obtained by incorporating small particle size pigments modified with minute amounts of copper phthalocyanine sulfonic acid.

US Pat. Appl. Pub. No. 2004/0194666, incorporated herein in its entirety by reference, discloses surface modification of transparent organic pigments with a copper phthalocyanine green pigment to produce pigments capable of creating flop-effect, pigment compositions.

U.S. Pat. No. 5,997,627, incorporated herein in its entirety by reference, discloses pigment compositions containing a small particle size porous filler and a pigment, and their use for preparing effect coating compositions exhibiting strong lightness and color flop with a pronounced three dimensional effect.

Although milling or grinding an organic pigment with a mica or other silicate additive to generate a pigment with good chroma is known, it has been found that using particular nano-sized particles of certain silicas, that is fumed silica, as an additive in a controlled milling or grinding process yields organic pigments with not only excellent chroma and dispersion characteristics, but also greatly enhanced color flop, especially when the processed pigment is incorporated into a polymer composition, for example, an automotive coating.

SUMMARY OF THE INVENTION

The invention provides a method wherein the co-milling of an organic pigment along with fumed silica as an additive yields a pigment particle comprising an intimate mixture of the organic pigment and fumed silica, which pigment particle exhibits improved color properties, in particular excellent chroma and enhanced color flop, when incorporated into polymer systems such as plastics and coatings.

DESCRIPTION OF THE INVENTION

Provided is a process for producing a pigment with improved coloristic properties which process comprises milling a mixture comprising from 1 to 50 parts by weight of fumed silica particles and from 50 to 99 parts by weight of an organic pigment based on the total weight of the fumed silica/organic pigment mixture.

For example, the process comprises milling a mixture comprising from 1 to 35 parts of fumed silica particles and from 65 to 99 parts of an organic pigment, from 3 to 30 parts of fumed silica particles and from 70 to 97 parts of an organic pigment or from 5 to 25 parts of fumed silica particles and from 75 to 95 parts of an organic pigment.

Upon incorporation into polymeric substrates, such as plastics and coatings, the pigment resulting from the method of the invention exhibits increased chroma and color flop when compared to the incorporation of the organic pigment as it exists prior to co-milling, and also in many cases exhibits increased chroma and color flop when compared to the organic pigment milled using other, known methods.

The materials used in the invention are commercially available and are prepared by methods known in the art.

Fumed silica is a very fine, <1 µm non-crystalline silica, $SiO_2$, produced by the oxidation of silicon containing compounds. For example, fumed silica is generally produced by the vapor phase hydrolysis of chlorosilanes, such as silicon tetrachloride, in a hydrogen/oxygen flame to form submicron sized molten spheres of silica.

These particles collide and fuse to form three dimensional branched, chain-like aggregates, of approximately 0.1 to 0.5 micron in length. Cooling takes place very quickly, limiting the particle growth and ensuring that the fumed silica is amorphous. These aggregates can in turn become mechanically entangled to form agglomerates ranging in size from 0.5 to 44 micron. Fumed silica produced by pyrogenic processes is characterized by having a high air content and a correspondingly low bulk density. Generally, fumed silicas have B.E.T. (Brunauer Emmet Teller determined) surface areas ranging from about 50 to about 400 square meters per gram (sq. m/g) and bulk densities ranging from about 10 to about 50 g/l. Fumed silicas generally have very high purity, with total impurities, in many cases below 100 ppm.

The fumed silica, as directly produced via this method, is hydrophilic but can be treated with chemical agents, such as hexamethyldisilazane and dimethyldichlorosilane, to produce hydrophobic fumed silicas. In general, agents known in the art which render hydrophilic fumed silica hydrophobic include alkyl or aryl halosilanes, silanes, mixtures thereof, and siloxanes.

A variety of hydrophilic and hydrophobic fumed silicas are commercially available and either may be used in the present invention.

As mentioned above, initially formed fumed silica particles, which are extremely small, are known to combine and form larger aggregates. The aggregates can also form into more loosely associated agglomerates. The fumed silicas of the present invention have particle sizes of less than 1 micron and excellent results are achieved with mean particle sizes of less than 0.5 microns for example, 0.1 to 0.4 microns, 0.1 to 0.2 microns or less. The primary particle size, that is the size of the fumed silica particle which forms the aggregates are smaller than 1 micron, typically smaller than 0.5 microns. The primary particles can be, for example between about 0.001 and about 0.5 microns; excellent results are achieved when the fumed silica primary particles are between about 0.005 and about 0.1, for example between about 0.01 and about 0.1 microns.

For example, excellent results are obtained when using fumed silica particles with a mean aggregate size of 0.1 to 0.5 microns and a primary particle size of between 0.005 and 0.1 microns. For example, the mean aggregate size is from about 0.1 to about 0.2 microns.

The present method of milling an organic pigment with fumed silica is a general method applicable with any organic pigment or pigment crude.

Typically the organic pigment which is milled during the present process has an average particle size in the range of from 0.005 to 10 microns, typically from 0.01 to 5 microns.

Based on these average particle size ranges, it is clear that the organic pigment is used in the form of a pigment crude or a conditioned pigment.

Suitable classes of pigments and pigment crudes include the azo, azomethine, methine, anthraquinone, phthalocyanine, perinone, perylene, diketopyrrolopyrrole, thioindigo, iminoisoindoline, iminoisoindolinone, quinacridone, flavanthrone, indanthrone, anthrapyrimidine and quinophthalone pigments; for example, the diketopyrrolopyrrole, quinacridone, phthalocyanine, indanthrone or iminoisoindolinone pigments.

The pigment of the invention may comprise one or more classes of pigments. It may also be a solid solution comprising two or more pigments or pigment classes.

Notable pigments useful in the present process can be found in The Colour index, including the quinacridone pigments, such as C.I. Pigment Red 202, C.I. Pigment Violet 19, and C.I. Pigment Red 122; the perylene pigments, for example, C.I. Pigment Red 179; the azo condensation pigments, for example, C.I. Pigment Red 170, C.I. Pigment Red 144, and C.I. Pigment Brown 23; the isoindolinone pigments, for example, C.I. Pigment Orange 61, C.I. Pigment Yellow 109, and C.I. Pigment Yellow 110; the diketopyrrolopyrrole pigments, for example, C.I. Pigment Red 254, C.I. Pigment Red 255; C.I. Pigment Red 264, C.I. Pigment Orange 71, and C.I. Pigment Orange 73; the copper phthalocyanine pigments, for example, C.I. Pigment Blue 15; and the anthraquinone pigments, for example, C.I. Pigment Blue 60, C.I. Pigment Red 177 and C.I. Pigment Yellow 147.

Excellent results are achieved when the present method is used in the preparation or processing of small particle size or transparent pigments. For example, highly saturated, small particle size pigments are preferred for metallized automotive coatings.

Typically, a small particle size pigment is any pigment having a specific surface area in the range from 40 to 100 $m^2/g$; often the small particle size pigment has a specific surface area in the range from 50 to 90 $m^2/g$ or from 60 to 80 $m^2/g$.

In general, pigments having a surface area within the above-indicated ranges are referred to as transparent pigments due to their lack of light scattering.

The co-milling process of the invention, also called the "milling process", can be horizontal or vertical media mills, batch or continuous, wet or dry e.g., any process that imparts shear into particulates. Also present during the milling can be standard milling components such as solvents including water and organic solvents; milling media, e.g., metal balls, nails, ceramics, inorganic particles such as salts or other metal oxides; dispersants; anti foam agents; rheology control agents, polymers and the like.

The organic pigment may be treated in a variety of known methods prior to milling and the product after milling can also be treated according to common practices including subsequent milling processes.

For example, an organic pigment is treated with 2% Polyvinylpyrrolidone (PVP) and then milled along with fumed silica and properly sized milling media. The mill product is discharged and media separated from the pigment. The pigment is, for example, dispersed into paint and applied to a metallic substrate in a two-coat system.

The present invention also provides a pigment composition comprising an intimate mixture from 1 to 50 parts by weight of fumed silica particles and from 50 to 99 parts by weight of an organic pigment based on the total weight of the fumed silica/organic pigment intimate mixture.

For example, the pigment composition comprises from 1 to 35 parts of fumed silica particles and from 65 to 99 parts of an organic pigment, from 3 to 30 parts of fumed silica particles and from 70 to 97 parts of an organic pigment or from 5 to 25 parts of fumed silica particles and from 75 to 95 parts of an organic pigment.

The pigment compositions of the invention exhibit increased chroma and color flop when compared to the organic pigment as it exists prior to co-milling with fumed silica when incorporated into polymeric substrates, such as plastics and coatings. In many cases, the present pigment compositions have greater chroma and color flop when likewise compared to the organic pigment milled using other known methods.

In one embodiment of the invention, the pigment composition comprises an organic pigment and fumed silica particles of less than 1 µm. For example, the fumed silica comprised by the pigment composition is a particle which contains an aggregate of fumed silica primary particles wherein the particle size of the aggregate less than 1 micron, for example, the aggregate is a three dimensional branched, chain-like aggregate of approximately 0.1 to 0.5 micron in length, for example, the particle size of the aggregate is from about 0.1 to about 0.4 microns, 0.1 to 0.2 microns or less.

The primary particle size of the fumed silica are smaller than 1 micron, typically smaller than 0.5 microns, for example between about 0.001 and about 0.5 microns; excellent results are achieved when the fumed silica primary particles are between about 0.005 and about 0.1, for example between about 0.01 and about 0.1 microns.

For example, excellent results are obtained when using fumed silica particles with a mean aggregate size of 0.1 to 0.5 microns and a primary particle size of between 0.005 and 0.1 microns. For example, the mean aggregate size is from about 0.1 to about 0.2 microns.

The fumed silica comprised by the pigment composition is hydrophilic or hydrophobic. Flop Index is the measurement on the change in reflectance of a metallic color as it is rotated through the range of viewing angles. A flop index of 0 indicates a solid color, while a very high flop metallic or pearlescent basecoat/clearcoat color may have a flop index of 15-17.

By "Flop Index rating" or "Flop Index" as used herein is meant the value calculated using the following equation:

$$\text{Flop Index} = \frac{2.69(L^*_{15°} - L^*_{110°})^{1.11}}{(L^*_{45°})^{0.86}}$$

wherein L15 is a measurement of the amount of visible light reflected 15 degrees off specular (visually L15 corresponds to the color of the face angle);

L45 is a measurement of the amount of light reflected 45 degrees off specular (visually L45 corresponds to the color of the flash angle); and L110 is a measurement of the amount of light reflected 110 degrees off specular (visually L110 corresponds to the color for the flop angle).

Flop Index rating measurements are conveniently made using commercially available instruments such as an XRITE MA68-11 flop index instrument available from Xrite Inc., Grandville, Mich.

In one embodiment of the present invention, the pigments produced by the inventive process when incorporated into a commercial automotive coating formulation provide a Flop Index rating of 9 or greater, typically 10 or greater, and often 11 or 12 or greater, for example a Flop Index rating of from 9 to 30, from 10 to 30, from 11 to 30 or 12 to 30.

It is convenient, for example, to measure the Flop Index on fully opaque coatings. The weight ratio of instant pigments to effect pigments like metallic, graphite or pearlescent pigments is preferably from 1:99 to 99:1

The pigment compositions of the present invention are characterized in part by the presence of fumed silica. Fumed silica, as described above, is a particular type of amorphous silica comprised of extremely small primary particles which form aggregates that are also quite small and have a particular three dimensional branched, chain-like structure with high surface area.

The pigment compositions of the present invention are also characterized in part by being an intimate mixture of fumed silica and organic pigment. As used herein, "intimate mixture" refers to a physical mixture of at least two components which are in direct physical contact with each other. For example, one component may coat the other component or one component may adhere directly to the outer surface of the particle comprising the other component. Alternately, the material of one component may be intermingled or intertwined with the other component.

In the present pigment compositions, the milling forces the fumed silica against the organic pigment with enough force to form a pigment particle which is an intimate mixture of the these components. That is the pigment particle formed has fumed silica particles embedded into or onto an organic pigment.

The present inventive pigment composition is therefore physically differentiated from the pigment composition of U.S. Pat. No. 5,667,580 in at least these two ways.

U.S. Pat. No. 5,667,580 discloses pigment compositions containing an organic pigment and a transparent filler having a mean particle size less than 10 micron and a narrow particle size distribution. The filler of U.S. Pat. No. 5,667,580 can be an inorganic material but an organic filler of polypropylene or polyamide is preferred. The inorganic fillers described are, in one representative embodiment, pearlescent pigment comprised of flaky micas, mainly with a particle size in the range from 10 to 30 microns, covered with a thin layer of a metal oxide, such as $TiO_2$.

In the processes of U.S. Pat. No. 5,667,580, fumed silica is not used, is not part of the final pigment composition and the disclosure does not report the color advantages of the present pigment compositions.

Further, U.S. Pat. No. 5,667,580 describes physical mixtures wherein the filler or milling additive, "is, for the most part, not coated with the organic pigment", and not the intimate mixture of organic pigment and additive, i.e., fumed silica, provided herein.

The pigment compositions provided by the present invention, also referred to herein as the "inventive pigments", are useful in pigmenting high molecular weight materials, in particular natural or synthetic polymers. The invention therefore also provides pigmented polymeric compositions comprising a natural or synthetic polymer and an inventive pigment, i.e., an intimate mixture of an organic pigment and fumed silica.

The polymer composition may also optionally have incorporated therein other additives such as antioxidants, UV absorbers, hindered amine or other light stabilizers, phosphites or phosphonites, benzofuran-2-ones, thiosynergists, polyamide stabilizers, metal stearates, nucleating agents, fillers, reinforcing agents, lubricants, emulsifiers, dyes, pigments, dispersants, optical brighteners, flame retardants, antistatic agents, blowing agents and the like, other processing agents or mixtures thereof.

For example, the naturally occurring or synthetic polymer may be a thermoplastic, thermoset, crosslinked or inherently crosslinked polymer, for example, a polyolefin, polyamide, polyurethane, polyacrylate, polyacrylamide, polyvinyl alcohol, polycarbonate, polystyrene, polyester, polyacetal, polysulfone, polyether, polyether ketone, cellulose ether, cellulose ester, a natural or synthetic rubber or a halogenated vinyl polymer such as PVC, alkyd resins, epoxy resins, unsaturated polyesters, unsaturated polyamides, polyimides, fluorinated polymers, silicon containing polymer, carbamate polymers and copolymers thereof such as those listed below.

1. Polymers of mono- and di-olefins, for example polypropylene, polyisobutylene, polybutene-1, poly-4-methylpentene-1, polyisoprene or polybutadiene and also polymerisates of cyclo-olefins, for example of cyclopentene or norbornene; and also polyethylene (which may optionally be crosslinked), for example high density polyethylene (HDPE), high density polyethylene of high molecular weight (HDPE-HMW), high density polyethylene of ultra-high molecular weight (HDPE-UHMW), medium density polyethylene (MDPE), low density polyethylene (LDPE), and linear low density polyethylene (LLDPE), (VLDPE) and (ULDPE).

Polyolefins, that is to say polymers of mono-olefins, as mentioned by way of example in the preceding paragraph, especially polyethylene and polypropylene, can be prepared by various processes, especially by the following methods:
a) by free radical polymerisation (usually at high pressure and high temperature);
b) by means of a catalyst, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either π- or σ-coordinated. Such metal complexes may be free or fixed to carriers, for example to activated magnesium chloride, titanium(III) chloride, aluminium oxide or silicon oxide. Such catalysts may be soluble or insoluble in the polymerisation medium. The catalysts can be active as such in the polymerisation or further activators may be used, for example metal alkyls, metal hydrides, metal alkyl halides, metal alkyl oxides or metal alkyl oxanes, the metals being elements of group(s) Ia, IIa and/or IIIa. The activators may have been modified, for example, with further ester, ether, amine or silyl ether groups.

2. Mixtures of the polymers mentioned under 1), for example mixtures of poly-propylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, for example ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, for example, polyamides.

4. Hydrocarbon resins (for example $C_5$-$C_9$) including hydrogenated modifications thereof (for example tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/-butadiene/alkyl acrylate and methacrylate, styrene/maleic anhydride, styrene/acrylo-nitrile/methyl acrylate; high-impact-strength mixtures consisting of styrene copolymers and another polymer, for example a polyacrylate, a diene polymer or an ethylene/-propylene/diene terpolymer; and also block copolymers of styrene, for example styrene/-butadiene/styrene, styrene/isoprene/styrene, styrene/ethylene-butylene/styrene or styrene/ethylene-propylene/styrene.

7. Graft copolymers of styrene or a-methylstyrene, for example styrene on poly-butadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, for example polychloroprene, chlorinated rubber, chlorinated and brominated copolymer of isobutylene/isoprene (halobutyl rubber), chlorinated or chlorosulfonated polyethylene, copolymers of ethylene and chlorinated ethylene, epichlorohydrin homo- and co-polymers, especially polymers of halogen-containing vinyl compounds, for example polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from α,β-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, for example acrylonitrile/butadiene copolymers, acrylo-nitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, poly-ethylene oxide, polypropylene oxide or copolymers thereof with bisglycidyl ethers.

13. Polyacetals, such as polyoxymethylene, and also those polyoxymethylenes which contain comonomers, for example ethylene oxide; polyacetals modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxyl groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides, polyether imides, polyester imides, polyhydantoins and polybenzimidazoles.

18. Polyesters derived from dicarboxylic acids and dialcohols and/or from hydroxy-carboxylic acids or the corresponding lactones, such as polyethylene terephthalate, polybutylene terephthalate, poly-1,4-dimethylolcyclohexane terephthalate, polyhydroxy-benzoates, and also block polyether esters derived from polyethers with hydroxyl terminal groups; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol-formaldehyde, urea-formaldehyde and melamine-formaldehyde resins.

22. Drying and non-drying alkyd resins.

23. Unsaturated polyester resins derived from copolyesters of saturated and unsaturated dicarboxylic acids with polyhydric alcohols, and also vinyl compounds as crosslinking agents, and also the halogen-containing, difficultly combustible modifications thereof.

24. Crosslinkable acrylic resins derived from substituted acrylic esters, e.g. from epoxy acrylates, urethane acrylates or polyester acrylates.

25. Alkyd resins, polyester resins and acrylate resins that are crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of bisphenol-A diglycidyl ethers, bisphenol-F diglycidyl ethers, that are crosslinked using customary hardeners, e.g. anhydrides or amines with or without accelerators.

27. Natural polymers, such as cellulose, natural rubber, gelatin, or polymer-homologously chemically modified derivatives thereof, such as cellulose acetates, propionates and butyrates, and the cellulose ethers, such as methyl cellulose; and also colophonium resins and derivatives.

28. Mixtures (polyblends) of the afore-mentioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermo-plastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The polymer composition containing the inventive pigment may be a coating which has been applied to a substrate. The coating can comprise any coating system, or even a preformed film, which both adheres to the substrate and is compatible with the selected pigment, for example, auto coatings, marine coatings, paints, inks, laminates, receiving layers for printing applications, or other protective or decorative coatings including fabric treatments and coatings or films used in glazing applications.

The coating composition according to the invention can be applied to any desired substrate, for example to metal, wood, plastic, composite, glass or ceramic material substrates by the customary methods, for example by brushing, spraying, pouring, draw down, spin coating, dipping or electrophoresis; see also Ullmann's Encyclopedia of Industrial Chemistry, 5th Edition, Vol. A18, pp. 491-500.

Typically, the coating comprises a polymeric binder which can in principle be any binder customary in industry, for example those described in Ullmann's Encyclopedia of Industrial Chemistry, 5th Edition, Vol. A18, pp. 368-426, VCH, Weinheim 1991. In general, it is a film-forming binder based on a thermoplastic or thermosetting resin, predominantly on a thermosetting resin. Examples thereof are alkyd, acrylic, acrylamide, polyester, styrenic, phenolic, melamine, epoxy and polyurethane resins.

For example, non-limiting examples of common coating binders useful in the present invention include silicon containing polymers, fluorinated polymers, unsaturated polyesters, unsaturated polyamides, polyimides, crosslinkable acrylic resins derived from substituted acrylic esters, e.g. from epoxy acrylates, urethane acrylates, polyester acrylates, polymers of vinyl acetate, vinyl alcohol and vinyl amine. The coating binder polymers may be co-polymers, polymer blends or composites.

Coatings are frequently crosslinked with, for example, melamine resins, urea resins, isocyanates, isocyanurates, polyisocyanates, epoxy resins, anhydrides, poly acids and amines, with or without accelerators.

The binder can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p.469, VCH Verlagsgesellschaft, Weinheim 1991.

The binder may be a surface coating resin which dries in the air or hardens at room temperature. Exemplary of such binders are nitrocellulose, polyvinyl acetate, polyvinyl chloride, unsaturated polyester resins, polyacrylates, polyurethanes, epoxy resins, phenolic resins, and especially alkyd resins. The binder may also be a mixture of different surface coating resins. Provided the binders are curable binders, they are normally used together with a hardener and/or accelerator.

Examples of coating compositions containing specific binders are:

1. coatings based on cold- or hot-crosslinkable alkyd, acrylate, polyester, epoxy or melamine resins or mixtures of such resins, if desired with addition of a curing catalyst;

2. two-component polyurethane coatings based on hydroxyl-containing acrylate, polyester or polyether resins and aliphatic or aromatic isocyanates, isocyanurates or polyisocyanates;
3. one-component polyurethane coatings based on blocked isocyanates, isocyanurates or polyisocyanates which are deblocked during baking, if desired with addition of a melamine resin;
4. one-component polyurethane coatings based on a Tris-alkoxycarbonyltriazine crosslinker and a hydroxyl group containing resin such as acrylate, polyester or polyether resins;
5. one-component polyurethane coatings based on aliphatic or aromatic urethaneacrylates or polyurethaneacrylates having free amino groups within the urethane structure and melamine resins or polyether resins, if necessary with curing catalyst;
6. two-component coatings based on (poly)ketimines and aliphatic or aromatic isocyanates, isocyanurates or polyisocyanates;
7. two-component coatings based on (poly)ketimines and an unsaturated acrylate resin or a polyacetoacetate resin or a methacrylamidoglycolate methyl ester;
8. two-component coatings based on carboxyl- or amino-containing polyacrylates and polyepoxides;
9. two-component coatings based on acrylate resins containing anhydride groups and on a polyhydroxy or polyamino component;
10. two-component coatings based on acrylate-containing anhydrides and polyepoxides;
11. two-component coatings based on (poly)oxazolines and acrylate resins containing anhydride groups, or unsaturated acrylate resins, or aliphatic or aromatic isocyanates, isocyanurates or polyisocyanates;
12. two-component coatings based on unsaturated polyacrylates and polymalonates;
13. thermoplastic polyacrylate coatings based on thermoplastic acrylate resins or externally crosslinking acrylate resins in combination with etherified melamine resins;
14. paint systems based on siloxane-modified or fluorine-modified acrylate resins.

The coating composition can also comprise further components, examples being solvents, pigments, dyes, plasticizers, stabilizers, thixotropic agents, drying catalysts and/or levelling agents. Examples of possible components are those described in Ullmann's Encyclopedia of Industrial Chemistry, 5th Edition, Vol. A18, pp. 429-471, VCH, Weinheim 1991.

Possible drying catalysts or curing catalysts are, for example, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti or Zr, or organometallic compounds such as organotin compounds, for example.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethylmorpholine, N-methylmorpholine or diazabicyclooctane (triethylenediamine) and salts thereof. Further examples are quaternary ammonium salts, for example trimethylbenzyl-ammonium chloride.

Amino-containing resins are simultaneously binder and curing catalyst. Examples thereof are amino-containing acrylate copolymers.

The curing catalyst used can also be a phosphine, for example triphenylphosphine.

The coating compositions can also be radiation-curable coating compositions. In this case, the binder essentially comprises monomeric or oligomeric compounds containing ethylenically unsaturated bonds, which after application are cured by actinic radiation, i.e. converted into a crosslinked, high molecular weight form. Where the system is UV-curing, it generally contains a photoinitiator as well. Corresponding systems are described in the abovementioned publication Ullmann's Encyclopedia of Industrial Chemistry, 5th Edition, Vol. A18, pages 451-453. In radiation-curable coating compositions, the novel stabilizers can also be employed without the addition of sterically hindered amines.

The coating may also be a radiation-curable, solvent-free formulation of photopolymerisable compounds. Illustrative examples are mixtures of acrylates or methacrylates, unsaturated polyester/styrene mixtures or mixtures of other ethylenically unsaturated monomers or oligomers.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Powder coatings are, for example, those described in Ullmann's Encyclopedia of Industrial Chemistry, 5th Ed., A18, pages 438-444. The powder coating material may also have the form of a powder-slurry (dispersion of the powder preferably in water).

Multilayer systems are possible, where the pigments of the invention reside in a coating (or substrate) which is then coated with another coating, such as a protective coating.

When used in a coating the inventive pigments are incorporated into the coating via techniques common in the art.

The compounds may be added as an individual component during blending, for example, dry blending of the resin prior to prior to processing, or the compound may be added as a blend, master batch, flush, or other concentrate in or with another substance prior to processing.

The compounds may be added during processing steps. Standard process steps for polymer resins and coating formulations are well known in the art and include extrusion, coextrusion, compression molding, Brabender melt processing, film formation, injection molding, blow molding, other molding and sheet forming processes, fiber formation, surface impregnation, dissolution, suspension, dispersion and other methods known in plastic and coatings technology.

When the pigments or dyes of the instant invention are used in a film, the film is applied to the surface by, for example, the use of an adhesive, or co-extruded onto the surface. A film can be prepared for example, from the resin melt, by casting from a solution or by another method known in the art. A preformed film may also be applied with heat which includes calendaring, melt applications and shrink wrapping.

The inventive pigments are particularly suitable for preparing industrial coatings and those conventionally employed in the automobile industry, especially in thermosetting resins such as acrylic/melamine resin, alkyd/melamine resin or thermoplastic acrylic resin systems, as well as in aqueous-based coating systems. The present pigment compositions are especially suitable for coloring solvent-borne and water-borne automotive finishes.

Generally, an effective pigmenting amount of the inventive pigment composition is incorporated into a high-molecular-weight organic material to be pigmented. An effective pigmenting amount is any amount suitable to provide the desired color in the high-molecular-weight organic material. In particular, the pigment compositions are used in an amount of from about 0.01 to about 30% by weight based on the weight of the high-molecular-weight organic material to be pigmented. Thus, the present invention embraces a method of preparing a pigmented a high-molecular-weight organic material, which comprises incorporating an effective pigmenting amount of an inventive pigment composition into the high-molecular-weight organic material.

The pigmented, high-molecular-weight organic materials which are colored according to the present process are useful in a variety of applications. For example, the high-molecular-weight organic material can be used for the preparation of lacquers, inks and enamel coating compositions. The pigmented high-molecular-weight organic materials prepared according to the present invention are particularly useful for preparing automotive coating paints.

Due to the small particle size of the inorganic and/or polymeric organic filler the present pigment compositions are particularly suitable for coloring high-molecular-weight organic materials which are plastics that are calendared, cast, molded or processed to fibers, and the like. Such pigmented plastics show practically no abrasion during processing. The pigment compositions impart excellent physical properties to colored plastic articles like polypropylene or polyamide fibers, plastic films, bottle crates and so on. Thus, the present invention further embraces processes wherein the high-molecular-weight organic compound is a plastic that is calendared, cast, molded or processed to fibers and to plastic articles that are calendared, cast, molded or processed to fibers.

Additionally, the present pigment compositions can be used as pigments for laser marking.

The present pigment compositions can be used alone or in conjunction with other pigments or dyes including interference pigments and effect pigments like metallic, graphite or pearlescent pigments; for example uncoated micas, aluminum flakes, multilayered color shifting flake pigments and graphite flakes. Striking effect shades are generated by using the present pigment compositions with known transparent titanium dioxide-coated mica pigments.

EXAMPLES

The following Examples serve to illustrate the invention without intending to be restrictive in nature; parts and percentages here and in the claims are by weight, unless otherwise stated.

Flop index is measured by using an XRITE MA 68 instrument. The paint evaluation was done in a HAPS (hazardous air pollutants) compliant mono-coat or BC/CC (base coat/clear coat) paint system.

Example 1

A mixture of 25 parts MONASTRAL Magenta RT-243-D quinacridone pigment, three parts fumed silica and 100 parts 1 cm spherical steel media in a ½ pint can is milled for 15 fifteen minutes. The can is discharged onto a 1 mm screen to separate the product from the media. The product is prepared into a paint mill base, letdown into a metallic paint and sprayed onto metallic substrate with a dry film thickness of 0.2 mils. The quality of said film is such that it has higher chroma and desirable dark flop.

Example 2

The procedure of Example 1 is repeated using a commercially available perylene pigment and milling time of 15 minutes to produce a coating film with excellent chroma and desirable dark flop.

Example 3

Inventive compositions of fumed silica and commercially available quinacridone magenta pigment is prepared as above and formulated into 85/15 aluminum metallic solvent borne automotive coatings using known materials and procedures. Analogous coating formulations containing a non-intimate mixture the quinacridone magenta pigment and fused silica prepared without milling as a control and the commercial quinacridone magenta preparation RT-243 are also prepared. Each formulation is sprayed onto metal panels and Flop Index and delta C ($\Delta C$) are measured and reported in the table.

Quinacridone Magenta, 85/15 Aluminum Metallic Solvent Borne

| Pigment sample | Flop Index | $\Delta C$ |
|---|---|---|
| INVENTION | 16.0 | 3.8 |
| CONTROL | 12.8 | −1.3 |
| COMMERCIAL PRODUCT | 13.0 | 0.0 |

Example 4

Analogously to Example 3, the inventive quinacridone magenta pigment/fumed silica composition, control and commercial preparation are formulated 85/15 aluminum metallic water borne automotive coatings. Each formulation is sprayed onto metal panels and Flop Index and delta C are measured and reported in the table.

Quinacridone Magenta, 85/15 Aluminum Metallic Water Borne

| Pigment sample | Flop Index | $\Delta C$ | Flop Index | $\Delta C$ |
|---|---|---|---|---|
| INVENTION | 9.8 | 0.6 | 10.6 | −1.7 |
| CONTROL | 9.0 | −0.1 | 9.7 | −2.6 |
| COMMERCIAL PRODUCT | 9.7 | 0.0 | 9.7 | 0.0 |

Example 5

Inventive compositions of fumed silica and commercially available perylene pigment is prepared as above and formulated into 70/30 aluminum metallic solvent borne automotive coatings using known materials and procedures. Analogous coating formulations containing the same perylene pigment milled without fumed silica as a control and the commercial perylene preparation Irgazin Red 179 are also prepared. Each formulation is sprayed onto metal panels and Flop Index and delta C are measured and reported in the table.

Perylene, 70/30 Aluminum Metallic Solvent Borne

| Pigment sample | Flop Index | ΔC |
|---|---|---|
| INVENTION | 11.7 | 3.2 |
| CONTROL | 10.6 | 5.3 |
| COMMERCIAL PRODUCT | 11.5 | 0.0 |

These experimental results are indicative of the desired effect. The advantageous color improvement is supplemented by significantly better flop. Flop is defined as color shift versus viewing angle.

The invention claimed is:

1. A process for producing a pigment which process comprises milling a mixture comprising from about 1 to 50 parts by weight of fumed silica particles, which have a particle size of less than 1 micron, and from about 50 to 99 parts by weight of an organic pigment based on the total weight of the fumed silica/organic pigment mixture, wherein the organic pigment is one or more selected from the group consisting of azo, azomethine, methine, anthraquinone, phthalocyanine, perinone, perylene, diketopyrrolopyrrole, thioindigo, iminoisoindoline, iminoisoindolinone, quinacridone, flavanthrone, indanthrone, anthrapyrimidine and quinophthalone pigments.

2. The process according to claim 1 which comprises milling a mixture comprising from about 1 to 35 parts of fumed silica particles and from about 65 to 99 parts of an organic pigment.

3. The process according to claim 1 which comprises milling a mixture comprising from about 3 to 30 parts of fumed silica particles and from about 70 to 97 parts of an organic pigment.

4. The process according to claim 1, wherein the fumed silica has a mean particle size of from about 0.1 to 0.4 microns.

5. The process according to claim 1, wherein the fumed silica particles comprise fumed silica primary particles of from about 0.001 to about 0.5 microns in size.

6. The process according to claim 1, wherein the fumed silica particles comprise fumed silica primary particles of from about 0.01 to about 0.1 microns.

7. The process according to claim 1, wherein the fumed silica particles have with a mean aggregate size of 0.1 to 0.5 microns comprising fumed silica primary particles of from about 0.005 to about 0.1 microns.

8. The process according to claim 6, wherein the fumed silica particles have with a mean aggregate size of from about 0.1 to about 0.2 microns.

9. The process according to claim 1, wherein the milling process is the wet or dry milling of the fumed silica and organic pigment using a horizontal or vertical media mill in a batch or continuous process in the presence of milling media selected from metal balls, nails, ceramics, inorganic salts or metal oxides and optionally one or more components selected from the group consisting of water, organic solvents, dispersant, anti foam agents, rheology control agents and polymers.

10. The process according to claim 1, which produces a pigment which when incorporated into a commercial automotive coating formulation, provides a Flop Index rating of 9 or greater.

* * * * *